No. 833,433. PATENTED OCT. 16, 1906.
C. H. WYMAN.
ASTRONOMICAL CHART.
APPLICATION FILED FEB. 5, 1906.
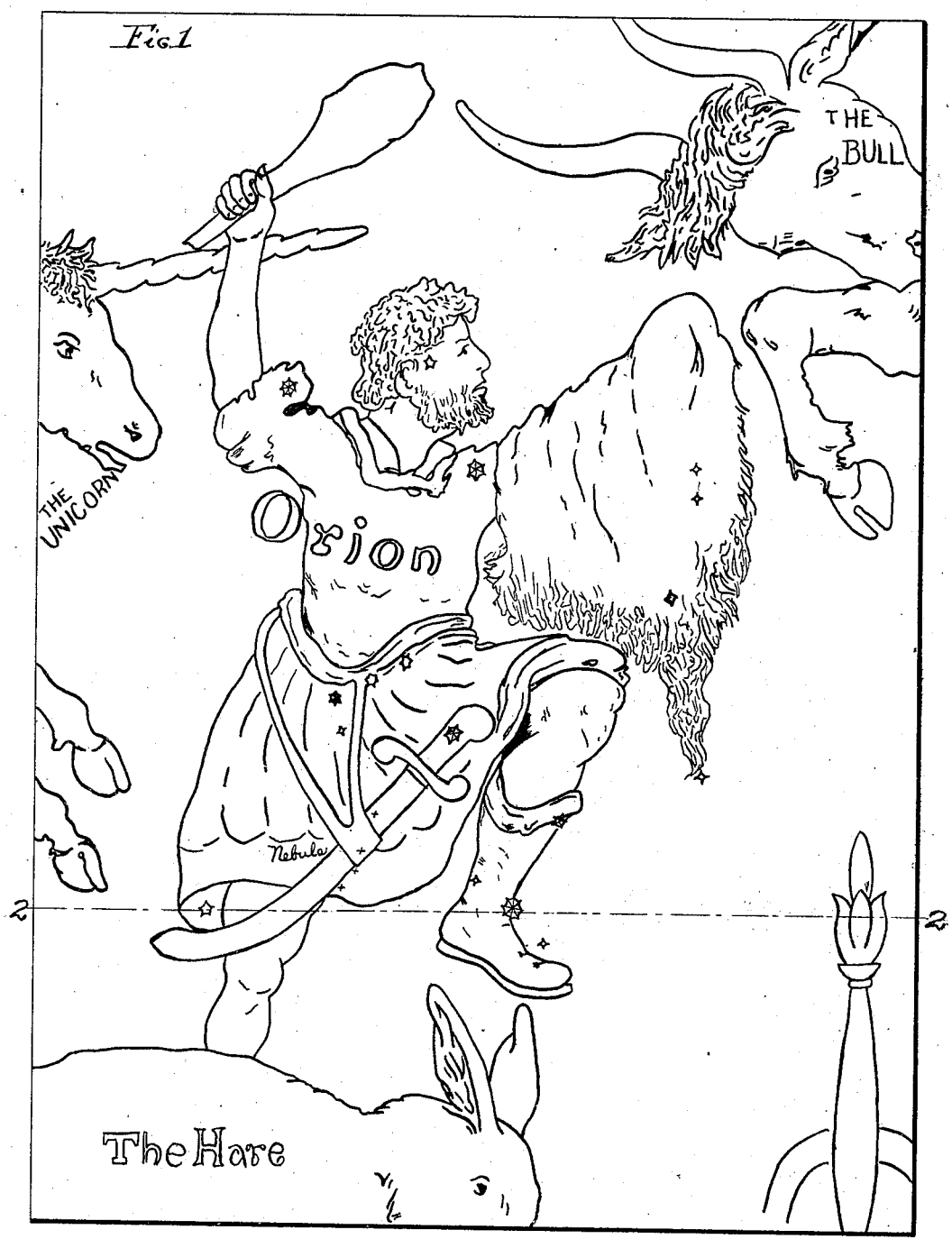

UNITED STATES PATENT OFFICE.

CHARLES H. WYMAN, OF WEBSTER GROVES, MISSOURI.

ASTRONOMICAL CHART.

No. 833,433. Specification of Letters Patent. Patented Oct. 16, 1906.

Application filed February 5, 1906. Serial No. 299,573.

*To all whom it may concern:*

Be it known that I, CHARLES H. WYMAN, a citizen of the United States, and a resident of Webster Groves, Missouri, have invented certain new and useful Improvements in Astronomical Charts, of which the following is a specification.

My invention relates to improvements in astronomical charts, and has for its object to provide a chart of the heavens mounted upon a sheet of opaque substance and being printed upon translucent paper, the opaque sheet being provided with perforations adapted to register with the location of the stars upon the chart, so that upon the proper illumination being applied to the back of the chart in a darkened room the stars will be shown illuminated in their proper respective positions and in approximately their relative magnitudes, the reproduction of each constellation being accompanied by the reproduction of a mythological figure whose name it bears.

In the drawings, Figure 1 is a plan view illustrating one of my charts. Fig. 2 is a perspective sectional view of the same, taken along the line 2 2 of Fig. 1.

It is the primary purpose of my invention to provide means to enable the unskilled observer to locate the principal constellations and to accompany the reproduction of the stars and their locations with a reproduction of the mythological symbols with which they are associated. My invention is therefore adapted to elementary educational purposes.

As shown in the drawings, the locations of the stars are indicated by being printed or embossed upon the translucent sheet 3, and upon each of the constellations the appropriate mythological figure is printed, as in the case of the reproduction of Orion in Fig. 1. The translucent sheet 3 is then superimposed upon the opaque sheet 4, which is provided with transverse perforations 5, adapted to register, both as to size and location, with the stars reproduced upon the sheet 3. When the transparency thus formed is held between the eye of the observer and a suitable source of illumination, the constellation or constellations shown upon the chart are indicated clearly, and upon the transparency being reversed, so that its face is illuminated, the mythological figure for which the constellation is named is shown.

Having fully described my invention, what I claim is—

In an astronomical chart, the combination of a translucent sheet having imprinted thereon a chart containing stars, and an opaque sheet whereon the translucent sheet is superimposed, the opaque sheet being provided with perforations adapted to register with the stars reproduced upon the translucent sheet, substantially as specified.

In testimony whereof I have signed my name to this specification in the presence of two subscribing witnesses.

CHARLES H. WYMAN.

Witnesses:
ALFRED A. EICKS,
M. M. BRAZILL.